Sept. 5, 1933.  T. E. STEIBER  1,925,212
MEANS FOR FACILITATING THE TAKING-OFF AND LANDING
OF AIRCRAFT AND REFUELING THE SAME
Filed Sept. 26, 1930   3 Sheets-Sheet 1
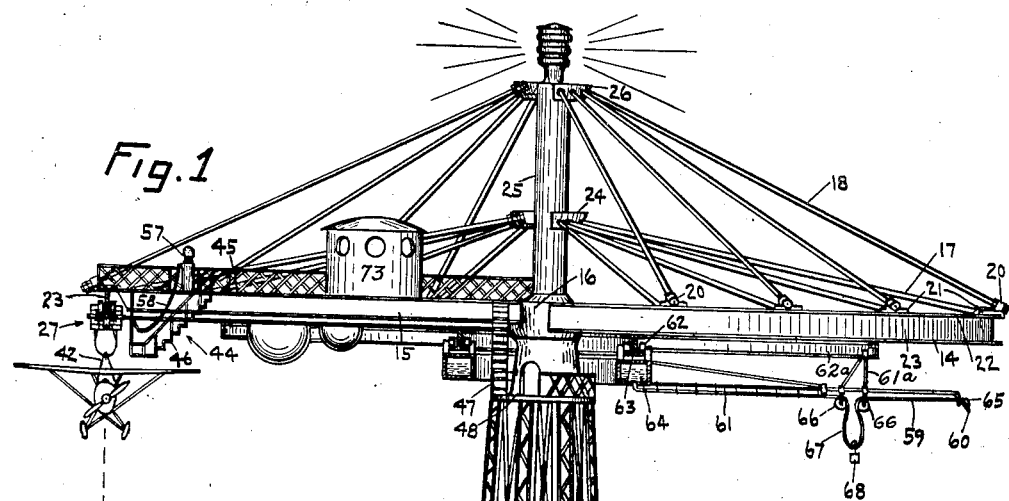
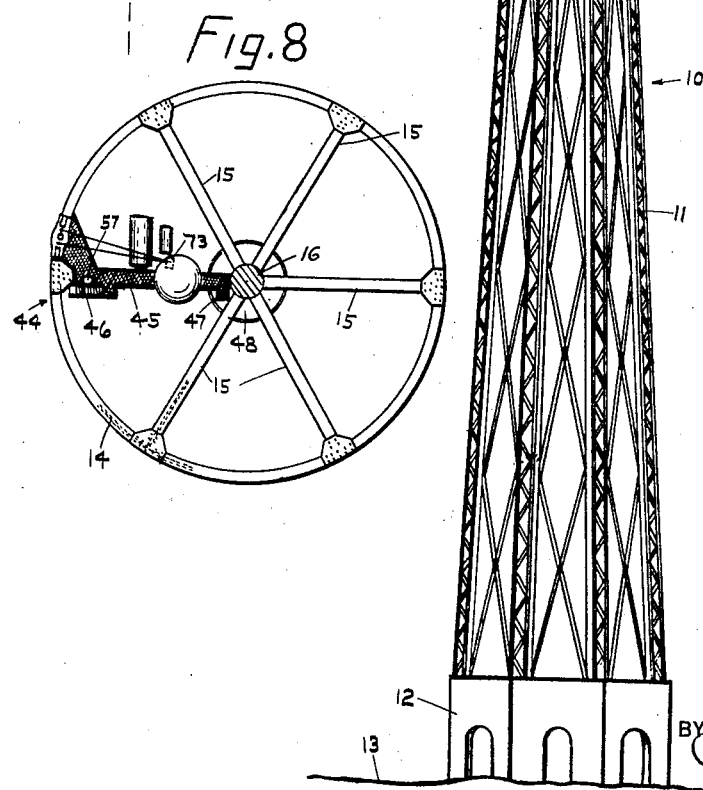
INVENTOR
T. E. Steiber
BY
ATTORNEY Sept. 5, 1933.  T. E. STEIBER  1,925,212
MEANS FOR FACILITATING THE TAKING-OFF AND LANDING
OF AIRCRAFT AND REFUELING THE SAME
Filed Sept. 26, 1930  3 Sheets-Sheet 2
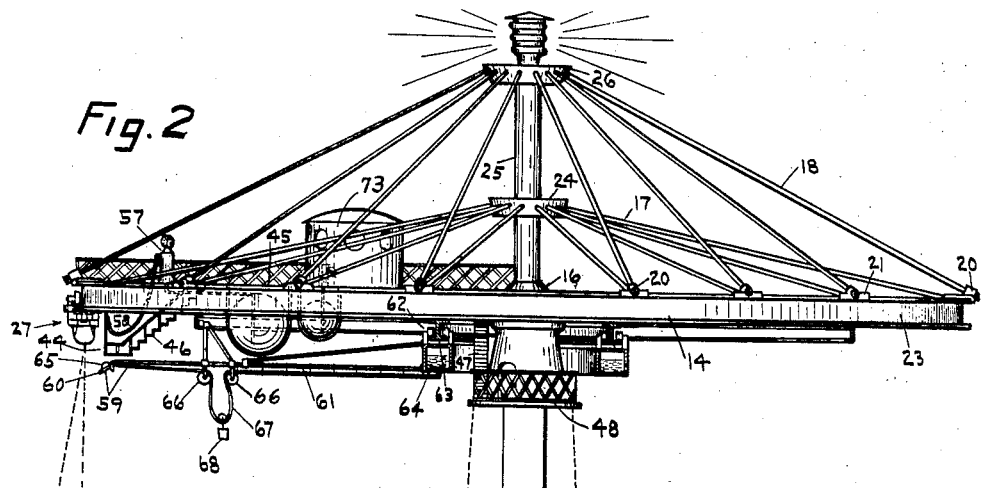
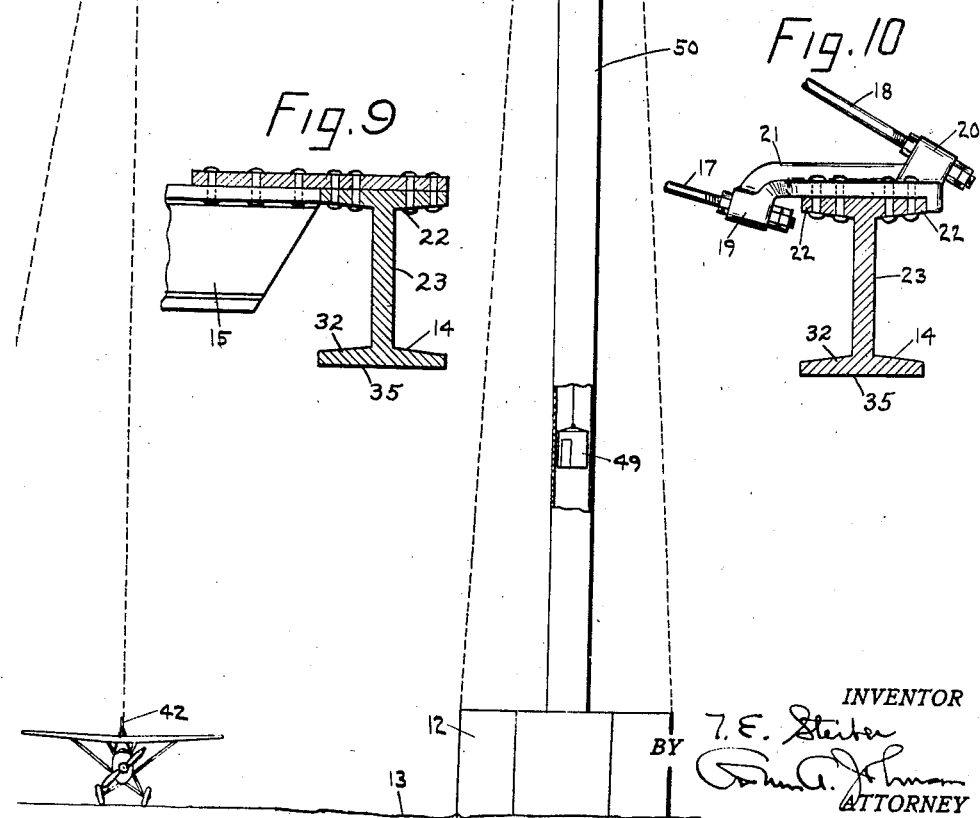
INVENTOR
T. E. Steiber
BY
ATTORNEY Sept. 5, 1933. T. E. STEIBER 1,925,212
MEANS FOR FACILITATING THE TAKING-OFF AND LANDING
OF AIRCRAFT AND REFUELING THE SAME
Filed Sept. 26, 1930 3 Sheets-Sheet 3
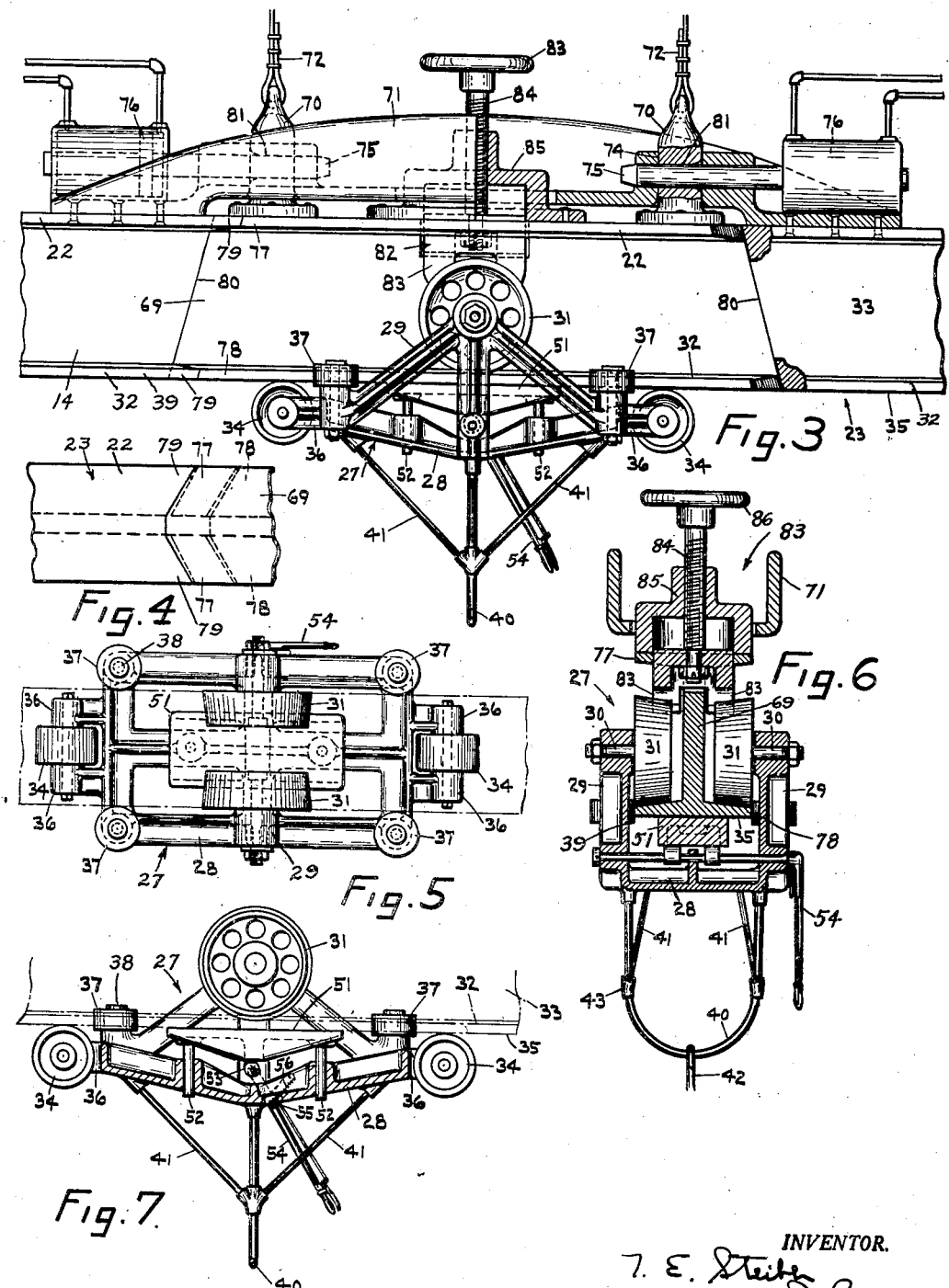
INVENTOR.
T. E. Steiber
BY
ATTORNEYS.

Patented Sept. 5, 1933

1,925,212

UNITED STATES PATENT OFFICE 1,925,212

MEANS FOR FACILITATING THE TAKING-OFF AND LANDING OF AIRCRAFT AND REFUELING THE SAME

Theodore E. Steiber, Bridgeport, Conn., assignor of one-half to Arthur A. Johnson, Bridgeport, Conn.

Application September 26, 1930
Serial No. 484,499

4 Claims. (Cl. 244—2)

This invention relates to means for facilitating the taking-off and landing of aircraft, particularly of the heavier than air type.

It is well known that the progress of aviation is impeded at the present time by the inability of aircraft to land and take-off with safety except from prepared landing fields. Some progress has been made in this direction by providing a catapult on vessels to allow airplanes to take-off therefrom, and, for lighter than aircraft, by providing a moving tower to which the nose of a dirigible may be anchored. In addition, the landing and taking off of an airplane from a dirigible has been accomplished by providing means on the dirigible and airplane respectively whereby the airplane can become hooked onto the dirigible to be carried thereby as long as desired.

Another problem confronting aviation is to facilitate refueling of aircraft without requiring that the ship or plane be brought to the ground or stopped. This has been accomplished experimentally by causing a refueling airplane to travel parallel with and close to the plane to be refueled and then dropping a hose to convey fuel and other material to it.

A solution to both these problems is presented by this invention by the provision of a structure which an airplane may approach at flying speed and become attached to, to be refueled without stopping by means provided by this invention; or, if desired, the airplane, after becoming attached to the structure, may have its motors throttled down and the plane stopped to discharge and/or receive passengers, freight, fuel, etc., or change pilots, after which the plane, while still attached to the structure, may be brought to flying speed and then become detached from the structure and proceed on its way. Further, this invention provides means whereby an airplane after "landing" on the structure may be removed from the structure, as, for instance, for a prolonged stay at the landing station or for repairs. And, conversely, an airplane may be placed on the structure for a "take-off."

This is accomplished in the specific form of this invention illustrated herein as exemplary thereof by providing a tower rising substantially above adjacent objects and having a circular track or rail of substantial circumference on which a carriage is mounted to travel around the tower. This carriage is provided with means to engage cooperating means on an airplane on which the latter may be supported.

In the accompanying drawings which illustrate one form of this invention as exemplary thereof—

Figure 1 is an elevation of the structure of this invention showing an airplane supported on the carriage in position to be refueled, or to discharge and take-on passengers or freight, or to be lowered to the ground as indicated in dotted lines.

Fig. 2 is a view similar to Fig. 1, but indicating the arrangement whereby an airplane may take-off from the ground while connected to a cable attached to the airplane supporting carriage.

Fig. 3 is a detail view showing the section of the circular rail on which the airplane carrier is supported when it is desired to lower the airplane to the ground and showing the details of the carriage.

Fig. 4 shows in plan the joint between the elevator section and the rest of the circular rail.

Fig. 5 is a top plan view of the traveling carriage which supports the airplane, showing the supporting wheels and the brake shoe.

Fig. 6 is a transverse sectional view of the airplane carrier shown in Fig. 5, showing it supported on the elevator section of the circular rail and also showing in detail the means for locking the carriage thereon.

Fig. 7 is a longitudinal sectional view showing the carriage and the brake mechanism therefor.

Fig. 8 is a plan view of the annular track at the upper end of the tower and showing the landing station thereon.

Fig. 9 is a detail view showing the manner in which the radial guides are secured to the I-beam forming the track.

Fig. 10 is a detail view of the I-beam showing the manner in which the guy-rods are connected thereto.

As shown in the accompanying drawings, the device of the present invention comprises a tower 10 preferably formed of lattice work 11 and rising from a foundation 12 at the ground level 13 to a substantial height above the ground and any adjacent objects. At its upper end the tower carries a circular track 14 coaxial with the tower and of as large a circumference as the height of the tower and other conditions permit. This circular track 14 is connected to radial arms 15 secured at their inner ends to a hub portion 16 formed on the tower (see Fig. 8) and the rail 14 is further supported by two sets of guy-rods 17 and 18. There may be as many guy-rods 17 and 18, or sets of guy-rods, as a sound structural engineering may dictate to properly support the circular track 14, and other connections between the tower and the rail may be effected in any conventional and satisfactory manner.

As shown herein, the guy-rods 17 and 18 at their lower ends extend through ears 19 and 20 in brackets 21 riveted to the top horizontal web 22 of the I-beam 23 which constitutes the track 14 in the form of the invention illustrated herein. At their upper ends, the guy-rods 17 are mounted in a ring 24 secured to a vertical pillar 25 rising above the hub portion 16 of the tower while the guy-rods 18 are secured to a ring 26 carried by the pillar 25 at a point thereon substantially above the ring 24. Thus, there is provided a three-point suspension for the I-beam 23 constituted by the radial arms 15 and guy-rods 17 and guy-rods 18 which will hold the circular track firmly on the tower.

As above stated, the present invention provides means whereby an airplane may "land" on the device of this invention or "take-off" therefrom. This is accomplished in the form of the invention herein disclosed, by providing a carriage 27 (see Figs. 3 to 7) which is adapted to ride upon the circular track 14, formed by the I-beam 23.

This carriage may have any suitable or desired form. As shown in the accompanying drawings, the carriage comprises a body portion 28 having vertically extending arms 29 having stud shafts 30 facing each other and each provided with a roller 31. These rollers are adapted to engage the lower web 32 of the I-beam with one roller at each side of the central web 33 thereof.

To reduce friction and permit the carriage to very freely travel on the I-beam 23, the rollers 31 may be provided with anti-friction bearings of any desired type, and preferably, the rollers are of such diameter as not to contact with the upper flange 22 of the I-beam. The carriage is held down with the rollers 31 engaging the lower web 32 of the I-beam by rollers or wheels 34 adapted to engage the lower surface 35 of the flange 32 of the I-beam. According to the present invention, there may be as many rollers 34 as desired, but as shown one is located at each end of the carriage and spaced substantially from the rollers 31 which are centrally located. When so placed, the rollers 34 prevent the carriage from rocking in a vertical plane about the point of engagement of the rollers 31 with the lower web 32 in the plane of the I-beam 23, at the same time the rollers 34 are wide enough to prevent the carriage from undesired rocking movement in a plane transverse to the plane of the I-beam.

These rollers 34 may also be provided with anti-friction bearings to cause the carriage to travel very freely on the rail and some clearance may be provided between the rollers 34 and the lower surface 35 of the rail so that when the carriage is balanced on the track, the rollers 34 do not necessarily engage the rail. The rollers 34 may be mounted in arms 36 carried by the carriage, as shown in Figs. 5 and 6.

In addition to this, the carriage 27 is provided with other rollers 37 mounted on vertical stub shafts 38 carried by the four corners of the carriage frame 28. These rollers are adapted to engage the edges 39 of the bottom web 32 of the I-beam and cause the carriage to be guided in its circular path on the rail 14.

The carriage is provided with means adapted to engage cooperating means on the airplane to support the latter. In the form of the invention shown herein, this is accomplished by providing a catch bar 40 secured to the body 28 of the carriage and suitably braced and supported by rods 41. The catch bar 40 is in the form of a bail and extends for a substantial distance below the body 28 of the carriage so that it may be engaged by a hook-like device 42 carried by the airplane.

In use, an aviator who wishes to negotiate a landing on the tower may, after observing the particular location of the carriage 27 on the track cause the airplane to approach the carriage 27 while traveling in a line tangential to the circular track 14 and at an elevation which will permit the hook-device 42 on the airplane to engage the catch bar 40 on the carriage. Or, the airplane may approach the carriage 27 while banking about the tower and at such an elevation that the hook-like device 42 will engage the catch bar 40, and for this and other purposes the catch bar is preferably made semi-circular.

In any event, once the hook-like device 42 is caught onto the catch bar 40, the motor or motors of the airplane are throttled down and the airplane travels around the track with the carriage until its momentum is spent.

Regardless of its direction of approach to the carriage, as soon as the airplane has become attached to the carriage, it should be sharply banked and steered by means of the rudder so as to aid it in following the path of the carriage without unduly straining either the carriage, the tower, or the airplane. While being banked and while being swung outwardly, due to centrifugal force as it rapidly travels with the carriage around the track 14, the hook device 42 is located somewhere between the ends 43 and the lowest portion of the catch rod 40 and, as the speed of the airplane and carriage decreases, the hook device will slide down the catch rod 40 and ultimately come to rest at the lower portion thereof.

In approaching the catch bar 40, the operator of the airplane may slow down to substantially landing speed and so avoid striking the catch bar with too great an impact, although, of course, it is not necessary to go excessively slow due to the fact that the carriage 27 so freely travels on the rail and is of such light weight that it may be picked up and caused to travel by the airplane without undue shock.

After the airplane is in a pendant position hanging on the catch bar 37, it may be caused to taxi about the tower while supported on the carriage to a landing station 44 which is connected with the tower by a walk 45 and which is provided with a ladder or stairs 46 by means of which passage to and from the airplane and landing station 44 may be had for the discharge and reception of passengers and/or freight, or for any other purpose for which a landing on the ground may be desired. The ladder or stairs 46 preferably is of a stationary type that will in no way obstruct or possibly interfere with the free travel of the airplane or carriage.

In the form shown, the walk 45, which is preferably supported by one of the radial arms 15, leads to the hub portion 16 of the tower at which point a stairway 47 is provided to connect the walk 45 with a platform 48 at the upper end of the tower and this platform 48 is connected with the ground by an elevator 49 traveling in a shaft 50, located within the tower structure (see Fig. 2). Thus, after the airplane is stopped at the station 44, an attendant may lower a ladder from the stairs 46 permitting the occupants of the airplane to reach the walk 45 and by means of the latter reach the stairs 47 to the platform 48 from which point they may be taken by the elevator to the ground, and the converse is true for those desiring to take passage on the airplane. The same is, of course, true for freight mail or other things desiring to be discharged or taken on by the airplane, the airplane meanwhile remaining suspended on the carriage at the landing station 44. If the airplane is of a type which may be started without twirling the propeller, the engines may be stopped while on the landing station 44.

To enable the airplane to be more rapidly brought to a stop at the landing station 44, the carriage 27 may be provided with a brake shoe 51 sliding on pins 52 and actuated by a cam 53 connected to a lever 54 which may be reached by an occupant of the airplane after the latter is supported on the catch bar 40 and be applied in the usual manner, a lock pawl 55 and segment 56 being provided to hold the lever 54 in operated position. This shoe 51 engages the under surface 35 of the I-beam between the portions which are engaged by the rollers 34.

After the stopping period of the airplane at the tower has terminated, the brake shoe 51 is released and the motors are accelerated to cause the airplane with the carriage 27 to travel around the circular track 14 and this is continued until the airplane has reached flying speed, at which time the hook device 42 on the airplane may be released from the catch bar 40 so as to allow the airplane to travel outwardly and upwardly away from the tower and proceed on its course, leaving the carriage free to travel around the tower until its momentum has been spent.

The airplane may be refueled while at the station 44, and to do this the latter is provided with a gasoline measuring and/or pumping device 57 which has a flexible hose 58, the end of which may be passed down to and placed in the gasoline tank of the airplane.

With some types of airplanes, the motors must be kept running continuously at a relatively high rate of speed, otherwise the oil will gum and it would be necessary to drain off the oil and refill with fresh oil before again starting. This is particularly true with extremely high speed airplanes. In such cases, the speed of the motors would not permit the airplane to remain at the landing station 44, but would be caused to continuously travel about the tower on the track 14, of course at a reduced speed. To permit such airplanes to refuel and to permit any other type airplane to be refueled should it not be desired to stop for any reason, the present invention provides means whereby the refueling of the airplane may be effected while the airplane continuously travels about the tower with the carriage 27 to which it is connected.

In the form of the invention shown herein, this is accomplished by providing a line of hose 59 extending out from the tower and having its nozzle 60 normally located near the path of the carriage 27. This hose 59 is supported by an arm 61 mounted on a carriage 62 similar to the carriage 27 but located on another circular track 63, preferably close to the tower. This carriage 62 supports a gasoline supply tank 64 which may be annular in form to which the end of the hose 59 is connected. The arrangement is such that the supporting arm 61 for the hose, the hose 59, and tank 64, with the carriage 62, may freely rotate about the tower. The outer end of the arm 61 may be supported by a carriage 61a riding on a circular track 62a (see Fig. 1).

Thus, should it be desired to refuel an airplane while it travels around the tower, the operator in the airplane reaches out with a hook similar to a boat-hook and catches a ring 65 on the hose 59, thereby causing the arm, hose and the carriage 62 to travel around the tower with the airplane. The nozzle 60 on the hose is then pulled into the airplane and its valve is opened so as to allow the gasoline to flow from the tank 64 into the tank of the airplane. The arm 61 carries rollers 66 between which a slack portion 67 normally held down by a weight 68 is provided to permit the nozzle end of the hose to be pulled toward the airplane so that the nozzle may be inserted in the airplane fuel tank.

On occasion, it may be desired to bring the airplane to the ground for repairs, servicing, or when it is desired to make a long stay at the landing tower—this is accomplished by the present invention by providing means for lowering the airplane to the ground level after it has been brought to a stop on the tower.

In the form of the invention herein shown, this is accomplished by making one section of the I-beam separable from the rest and providing means for lowering this section to the ground when the airplane is supported thereon. As shown in Fig. 3, this separable section of the track 14 is constituted by an I-beam 69 having lugs 70 extending upwardly through a bridge-piece 71 and connected at their upper ends to cables 72 leading to and controlled by a wench or elevator mechanism 73 supported on one of the radial beams 15 and the operation of which, when controlled by an attendant, will allow the section 69 of the track to be lowered to the ground, the cable 72 passing through holes 74 in the bridge-piece 71 as the section 69 descends.

Normally, the section 69 is locked to the bridge-piece 71 by plungers 75 each controlled by a hydraulic cylinder and piston 76 so that its upper and lower webs or flanges 77 and 78 are in alignment with the upper and lower flanges 22 and 32 of the I-beam 23. At the same time, the removable section 69 is kept in lateral alignment and connection with the ends of the I-beam 23 by forming the flanges 22 and 32 on the ends of the I-beam irregular in shape so as to fit correspondingly shaped flanges 77 and 78 on the removable section 69, as shown in Fig. 4. In this way, any tendency for the section 69 to be swung outwardly due to centrifugal force of the airplane and carriage when the carriage is supported on the section 69 is overcome by the projecting edges 79 of the flanges 22 and 32. The adjacent edges of the vertical webs 33 and 80 of the I-beam and section 69 respectively are oblique with relation to the horizontal flanges as shown in Fig. 3, so that the section 69 may be tightly wedged in between the ends of the I-beam when the plungers 75 are projected into the holes 81 in the lugs 70 which they engage, the plungers being tapered on their ends to permit them to engage and draw up the lugs 70 even should the latter not have been brought up quite far enough by the cables 72. The upper ends of the lugs 70 are also tapered so as to permit them to easily be drawn by the cable 72 into the holes 74 in the bridging-piece 71. The bridging-piece 71 is made sufficiently strong to firmly tie together the ends of the I-beam between which the removable section 69 is located.

For the purpose of locking the airplane supporting carriage 27 on the elevator section 69, the latter is provided with a locking device 82 which has arms 83 adapted to straddle the rollers 31 of the carriage 27. This locking device is controlled by a screw 84 threaded in a bonnet 85 in which the locking device 82 is normally located. To lock the carriage on the elevator section 69, a handwheel 83 on the screw 86 is rotated to cause the arms 83 to descend and straddle and firmly engage the wheels 31.

Variations and modifications may be made within the scope of this invention and portions of the improvements may be used without others.

Having thus described the invention, what is claimed as new and for which it is desired to obtain Letters Patent, is:—

1. In a device of the class described, a tower rising to a substantial height above adjacent objects; a circular track supported by the tower near the top thereof; a carriage traveling on said track and having means adapted to be detachably engaged by an airplane to support the latter for traveling movement about the tower; and a brake device for retarding movement of the carriage on the track, said brake device being operable by an occupant of the airplane when the latter is attached to a carrier.

2. In a device of the class described, a tower rising to a substantial height above adjacent objects; a circular track supported by the tower near the top thereof; a carriage traveling on said track and having means adapted to be detachably engaged by an airplane to support the latter, a section of said circular track being separable therefrom; and means for lowering said separable section to the base of the tower while the carriage supporting the airplane is located on said separable section to lower an airplane supported thereon to the base of the tower or to receive an airplane at the base of the tower and raise it to the level of said circular track.

3. A device of the class described, a tower rising to a substantial height above adjacent objects; a circular track supported by the tower near the top thereof; a carriage mounted to travel on said track and having means for supporting an airplane for movement therewith around the tower; another circular track on the tower; and means adapted to travel on the last-named track with the airplane supported on the carriage riding on the first-named track for refueling the airplane while traveling about the tower.

4. A device of the class described, a tower rising to a substantial height above adjacent objects; a circular track supported by the tower near the top thereof; a carriage mounted to travel on said track and having means for supporting an airplane for movement therewith around the tower; another circular track on the tower; a carriage on said second-named track; and a hose carried by said last-named carriage and extending from the last-named circular track to the vicinity of the circular track on which the airplane supporting carriage travels for conveying fuel to the airplane while the latter travels about the tower.

THEODORE E. STEIBER.